Nov. 17, 1931.   E. C. D'YARMETT   1,831,906
OIL DISTILLATION APPARATUS
Original Filed Dec. 16, 1926   2 Sheets-Sheet 1

Inventor
Edward C. D'Yarmett

By Cushman Bryant & Darby
Attorneys

Nov. 17, 1931. E. C. D'YARMETT 1,831,906
OIL DISTILLATION APPARATUS
Original Filed Dec. 16, 1925    2 Sheets-Sheet 2
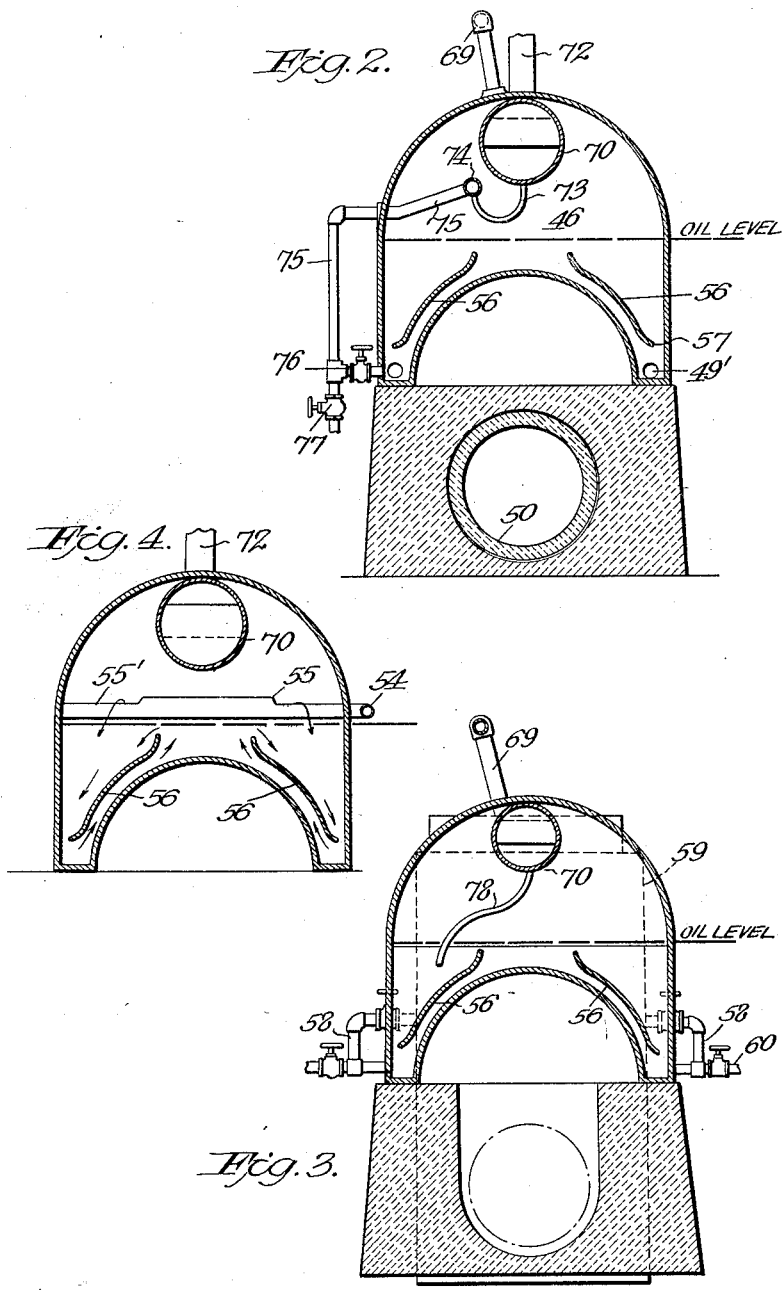

Patented Nov. 17, 1931

1,831,906

UNITED STATES PATENT OFFICE

EDWARD C. D'YARMETT, OF KANSAS CITY, MISSOURI, ASSIGNOR, BY DIRECT AND MESNE ASSIGNMENTS, TO THE FRACTIONATOR COMPANY, OF KANSAS CITY, MISSOURI, A CORPORATION OF MISSOURI

OIL DISTILLATION APPARATUS

Original application filed December 16, 1926, Serial No. 155,208. Divided and this application filed August 27, 1927. Serial No. 215,891.

The present invention relates to improvements in apparatus for oil distillation, and more particularly to apparatus for fractional distillation.

An object of the invention is to provide an apparatus for fractional distillation which is extremely simple and may be used with a minimum amount of personal supervision and attendance.

A further object of the invention is to insure the elimination of entrained liquid from vapors given off at various stages, and also to thoroughly subject the oil in the still to heat in such a way that any vapors given off will entrain a minimum amount, if any, of the liquid.

A further object is to insure continuous release of vapors from the body of liquid, to bring vapors of light fractions and the heavier liquid fractions into intimate contact, to avoid deposition of carbon, by moving the body of liquid longitudinally of the compartment, and at the same time, progressively increasing the heat longitudinally of the still compartment in the direction of oil flow. In order to obtain the full effect of the increased heat, and to accomplish the other objects, the liquid is preferably moved in local cyclic circulations repeatedly over the heated still surface, thereby producing vapors which pass upwardly through the heavier liquid fractions into intimate contact therewith. In other words, the liquid is moved not only longitudinally of the still, but in addition, has imparted thereto local cyclic circulations transversely of the longitudinal line of flow and of the heated surface, whereby the liquid is repeatedly passed over the surface as it passes through the zones of increasing heat. The light fractions are thus vaporized, and the heavier liquid fractions mingle with the vapors as they pass upwardly through the liquid, and also at the surface of the liquid body where the liquid is moving and thus comes into contact with the vapors thereabove. Another object of the invention is to confine the streams in the cyclic circulations as they pass over the heated surface, to relatively shallow depths, so that the heated surface has a substantial effect on the oil travelling in the streams. There is shown in the present application a practical form of apparatus in which the circulation is obtained by convection, or, in other words, by the effect of heat, means being provided within the container for forming or defining the streams.

The oil is heated in a still apparatus which includes any suitable liquid containing means, such as a plurality of chambers arranged in association with a suitable heating means, such as a single furnace, the oil being adapted to pass from one compartment to another, and being raised in each compartment to a predetermined temperature.

The vapors are taken off from each compartment or chamber, and directed through a dephlegmator in which the vapors and any entrained liquid follow a tortuous course. The path through the dephlegmator is arranged so that it has upwardly and downwardly directed portions adapted to vary periodically the velocity of the vapors passing therethrough, the vapors and liquid passing more slowly or with less velocity in the upwardly directed portions than in the downwardly directed portions. This is accomplished by providing a series of alternate upwardly and downwardly directed baffles arranged in pairs with narrower spaces forming the downwardly directed portions between the members of each pair than the spaces forming the upwardly directed portions which are between the separate pairs. This arrangement produces a relatively high velocity or rapid travel in the downward movements of the vapors as compared to the travel in the upward passages between the separate pairs of baffles. The rapid downward and slow upward movements cause any entrained liquid or unvaporized oil to be thrown out of the vapors as they travel through the tortuous course, and when the vapors leave the dephlegmator for the condenser, they contain no entrained oil or liquid of any kind.

Within the still container there is provided a suitable means, such as baffles arranged in such a position that the oil travels not only from one compartment to the other, but also it has a movement or cyclic circulation in shallow streams at an angle to the longitudinal travel, and in which it circulates upwardly over a heated zone, and downwardly through that portion of the still less exposed to heat. This circulation of the oil in its travel through each compartment prevents the generating of large quantities of steam at a time, should any water be carried into the still with the oil, and the small quantities of steam generated will pass from the still without entraining substantial quantities of oil, if any at all.

It will be understood that the movement of the liquid in cyclic streams as it advances longitudinally repeatedly passes the liquid over the heated surface, the heat of which increases longitudinally of the container in the direction of oil flow, and thus the oil is subjected to zones of progressively increasing heat as it passes through the compartment.

The above described features of the invention will be made clearer by a description of the embodiment of the invention which is disclosed in the accompanying drawings, wherein:

Figure 1 is a vertical longitudinal section through suitable form of apparatus.

Figure 2 is a vertical section on the line 2—2 of Figure 1.

Figure 3 is a vertical transverse section on the line 3—3 of Figure 1, looking in the direction of the arrows.

Figure 4 is a vertical sectional view on the line 4—4 of Figure 1.

Referring to the drawings, there is shown a preferred form of apparatus for carrying out my improved method.

In this preferred embodiment, the distilling chambers or compartments 46, 47 are formed within a casing 48 by means of a transverse partition 49 having openings 49' therein through which the oil unvaporized by the heat in the compartment 46, may pass to the compartment 47.

The casing has a cross-sectional shape with the bottom upwardly arched and the top curved. This form permits the heavier portions of oil being treated to sink to the bottom at the sides of the arched bottom, while lighter portions are received on top of the lower or more heated oil body. In other words, the heated surface of the container is of convexo-concave formation, by which is meant it has portions inclined relative to one another upwardly into the liquid container. This formation assists in maintaining the liquid within the container in a relatively shallow body, which forms substantially a film or shallow layer over the heated surface, whereby the heat may effectively penetrate the body of liquid. Moreover, the inclination of portions of the heated surface relative to one another, which is meant by the use of the expression convexo-concave in the specification and claims, tends to cause any carbon deposit upon the bottom to gravitate away from the major portion of the heated bottom toward the sides of the latter, and this gravitation is assisted by the cyclic circulations of the liquid.

The container may be heated from a combustion chamber 50 arranged beneath a horizontally extending partition or baffle 51, which terminates at 52 approximately on a line with the rear end of the compartment 46. The combustion chamber 50 is provided with any suitable source of heat such as the burner 51', and, preferably, it is mounted for sliding movement beneath the baffle or partition 51, so that as illustrated in dotted lines in Figure 4, it may be moved longitudinally to vary the point at which the products of combustion pass upwardly and reverse their course to travel beneath the bottom of the still compartments to the stack 53.

This construction causes the flame and products of combustion to pass first through the space beneath the secondary distilling compartment 47, or the last compartment of the series if more than two are employed, and then to return from the top of the baffle 51 to reach the outlet stack. Adjustment of the combustion chamber 50 may vary the distance of travel of the products of combustion beneath the compartments, and also direct the latter against the rear wall of the casing for a purpose which will be later described.

The oil to be treated is supplied to the upper portion of the first distilling compartment 46 through a pipe 54, the outlet end of which extends through the side wall of the casing 48, and over the relatively shallow concave pan 55. This pan extends transversely across the distilling chamber, and at substantially opposite sides of the longitudinal intermediate portion of the arched bottom has its forward edge cut away (Figure 4) so that the oil therein will flow over its forward wall in two separate streams, each of which is substantially co-extensive with the cut away portions 55'. The trough is provided primarily for the purpose of directing the oil downwardly only at opposite sides of the arched bottom where there are provided longitudinally extending baffles 56, the lower edges 57 of which are spaced from the side walls to provide passages through which the oil will travel downwardly as indicated by the arrows (Figure 4), and upwardly over the heated arched bottom.

It will be understood that the oil travels longitudinally of the container, due to the infeed pressure, and also in two substantially distinct cyclic streams around the baffles 56. That is to say, the oil circulates not only longitudinally of the still, but also upwardly over the heated arched bottom between the latter and the baffles, and then downwardly outside the baffles through that portion of the still less exposed to heat. The portion of the liquid around each baffle consists of a plurality of local cyclic circulations disposed longitudinally of the still compartment, so that the oil is repeatedly passed over the heated surface as it advances in shallow streams arranged between the baffles and the bottom. The arrangement of the heating means, as described, causes the heat to increase progressively longitudinally of the still. This method of circulating the oil prevents the generating of large quantities of steam at a time, should any water be carried into the still with the oil, and the small quantities of steam produced at any given time will be discharged without entraining substantial portions of the oil, if any at all.

The time required for the oil to pass through the compartment 46 is sufficient to insure that all the lighter fractions thereof will be vaporized while the heavier fractions will pass through the openings 49′ into the second distilling chamber or compartment 47 within which, as will be observed, the baffles 56 are arranged to function in the same manner as in the compartment 46. The baffle 56′ is provided in the second distilling chamber or compartment 47 so that the oil entering this chamber through the openings 49′ is caused to rise to the upper portion of the body of oil and flow over the upper edge of the baffle.

The relative heat range of each section or distilling compartment of the apparatus is partially controlled by the length thereof in relation to the other compartments or distilling chambers. For example, with an apparatus of the form particularly illustrated, wherein it is assumed to be desirable to employ temperatures in the compartment 46 ranging from 100 to 400 degrees (C.), or through a range of 300 degrees while the temperature in the compartment 47 will vary from 400 to 500 degrees (C.), or through a range of 100 degrees (C.), the compartment 46 is several times as long as the compartment 47.

The number of distilling compartments, and the relative lengths of each will, of course, be increased and relatively proportioned as appears desirable.

It will be understood, of course, that the container length is only one factor in the temperature range, another primary factor being the amount of heat supplied, it being possible, of course, to increase or decrease the heat supply by suitable adjustment of the burner 12.

Any oil unvaporized in the compartment 47 passes through pipes 58 to a vessel or chamber 59, or may, by means of a valve controlled branch 60, be discharged from the still without introduction into the chamber 59. The vessel 59 has a partition 61 and an overflow discharge opening 62, which is arranged to control automatically the level of oil within the still compartments. As will be understood, the level of oil within the still cannot exceed the plane of the overflow discharge opening 62 which is arranged to control automatically the level of oil within the still compartments.

This vessel may be constructed to serve also as a heat exchanger as in the previously described embodiment of the invention.

For this purpose, the vessel 59 is divided into several compartments by means of the partition 61 and an upper partition 63 forming a cylindrical compartment 64. The chamber of the compartment 64 communicates with a compartment 64′ below the partition 61 through pipes 65. The oil for the still is introduced into chamber 64′ through pipe 66 and will flow upwardly through the pipes 65, which are surrounded by the heated unvaporized oil from the still; thus the fresh oil supply is preliminarily heated before it reaches the chamber 64, and passes therefrom through pipe 54 to the first compartment of the still.

It will be observed that in the apparatus for carrying out the invention, the casing 59 is immediately adjacent the rear end of the flue beneath the still, so that the heat from the products of combustion which pass upwardly at the rear end of the combustion chamber may be directed against the same to assist the unvaporized oil from the still in preliminarily heating the fresh oil supply in the heat exchanger. As in the construction previously described, a conduit or pipe 69 may connect the upper end of the chamber 64 with the initial compartment of the still to equalize the pressure and permit the gravitational flow of the oil through pipe 54 to the compartment 46; and, further, any sediment which is prevented from passing upwardly by screen 67 in compartment 64′ may be drained therefrom by the drain pipe 68.

The vapors from the still container are conducted through a dephlegmator for the purpose of separating therefrom any entrained liquid. The dephlegmators are in the preferred embodiment positioned within the still casing so as to have maintained therein a high degree of heat, which will prevent condensation of any vapors before they pass from the dephlegmator. Each dephlegmator comprises a substantially cylindrical passage 70, having an inlet opening 71 adjacent the rear end of the compartment, and an outlet 72 extending through the top wall of the casing 48, this opening conducting vapors to a condenser (not shown). Within each dephlegmator is positioned a series of alternately arranged upwardly and downwardly extending baffles 72′. These baffles are, preferably, inclined to the vertical instead of being arranged in exact vertical planes. This inclination lengthens the tortuous path for the vapors and entrained liquid.

The baffles are arranged in distinct pairs forming downwardly extending branches 71', which are narrower or of less area than the upwardly extending branches 72'', the arrangement serving to increase the velocity of the vapors and entrained liquid in their downward movements, and giving slower upward movements. By positioning the dephlegmator within the still compartment, the heat of the still prevents condensation of vapors before they pass from the dephlegmator, and, moreover, the inclination of the baffles lengthens the path of the vapors within the casing 70.

Moreover, it will be noted that the branches 71' are at one portion somewhat constricted and the passage or branch flares or widens in a direction away from the constricted portion at opposite sides thereof. This construction serves to prevent back pressure from affecting the travel of the vapors, and serves, furthermore, to increase the velocity of the downwardly travelling vapors, thereby improving the whipping action which throws out of the vapors any entrained liquid.

Any liquid separated from the vapors within the dephlegmator of the first compartment is carried off by means of short pipes 73 to a heater 74, which, at one end, has a branch 75 (Fig 2.) extending through the wall of the casing, and from which the oil may be either returned to the still compartment 46 for further distillation through a valve-controlled branch 76, or withdrawn through a valve-controlled pipe 77. The dephlegmator casing 71 of the final compartment 47 has leading therefrom adjacent to each of the upwardly extending baffles 72', a liquid discharge pipe 78, each pipe being laterally and downwardly directed (Fig. 3) so that the liquid will be discharged below the level of the oil in the chamber and will, with the oil above and outside the baffle plates 56, pass downwardly and then upwardly inside the baffle over the arched heated bottom of the compartment.

It will be understood, of course, that numerous modifications may be made in the structures illustrated and described without departing from the invention.

Although the still, as shown, is mounted upon a fixed base, it is of very light and compact construction, and hence may be readily applied to a portable or wheeled base, which, of course, is within the scope of the invention.

The apparatus described progressively increases the heat of the liquid as it advances longitudinally of a still container, and at the same time, causes transverse (i. e., either vertically or horizontally) local cyclic circulations of the advancing liquid, and, preferably, in shallow streams, whereby it is repeatedly passed over the surface to come in contact with the zones of increasing heat. The local cyclic circulations may be in a single stream, or in a subdivided body, as explained, consisting of two streams, each having a plurality of these local cyclic circulations. The convexo-concave formation of the heated surface assists materially in providing a body of liquid of little or substantial film-like depth, which, therefore, may be effectively acted upon by the heat. Moreover, as will be understood, the inclination of portions of the surface, in addition to the cyclic streams, assists in causing gravitational movement of the carbon deposited on the heating surface relative thereto and away from the major portion of the heating zone toward the longitudinal center of the container. Such terms as are used in the specification and claims for including conventional apparatus are used in their broadest sense, and by container, for instance, is meant any suitable means for retaining the liquid when subjected to heat and permitting the circulations and travel defined. Obviously, this method may be carried out in various forms of apparatus, and is not limited to the specific apparatus described.

The present application is a continuation in part of my co-pending application, Serial No. 99,311, filed April 2, 1926, Patent No. 1,646,448 and a division of my application, Serial No. 155,208 filed December 16, 1926.

I claim:

1. In a dephlegmator for removing entrained liquid from hydro-carbon vapors, a casing and a plurality of alternately arranged upwardly and downwardly extending baffles in said casing forming a tortuous course having successive upwardly and downwardly directing portions, the successive baffles having overlapping outwardly curved portions with the spaces therebetween having constricted portions.

2. In a dephlegmator for removing entrained liquid from hydrocarbon vapors, a casing and a plurality of alternately arranged upwardly and downwardly extending baffles in said casing forming a tortuous course having successive upwardly and downwardly directing portions, the successive baffles having overlapping portions terminating in oppositely disposed convexed portions with the spaces therebetween having constricted portions.

In testimony whereof I have hereunto set my hand.

EDWARD C. D'YARMETT.